United States Patent
Cathier

(10) Patent No.: US 7,397,938 B2
(45) Date of Patent: Jul. 8, 2008

(54) METHOD AND SYSTEM FOR FAST NORMALIZED CROSS-CORRELATION BETWEEN AN IMAGE AND A GAUSSIAN FOR DETECTING SPHERICAL STRUCTURES

(75) Inventor: Pascal Cathier, Exton, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 718 days.

(21) Appl. No.: 10/915,075

(22) Filed: Aug. 10, 2004

(65) Prior Publication Data

US 2005/0041869 A1    Feb. 24, 2005

Related U.S. Application Data

(60) Provisional application No. 60/494,711, filed on Aug. 13, 2003.

(51) Int. Cl.
*G06K 9/00* (2006.01)
(52) U.S. Cl. .................. 382/131; 382/128; 382/209; 382/278; 708/422
(58) Field of Classification Search ......... 382/128–132, 382/209–217, 278; 708/422
See application file for complete search history.

(56) References Cited

U.S. PATENT DOCUMENTS

| | | | | |
|---|---|---|---|---|
| 5,987,094 | A | 11/1999 | Clarke et al. | 378/62 |
| 6,240,201 | B1 | 5/2001 | Xu et al. | 382/130 |
| 6,549,646 | B1 | 4/2003 | Yeh et al. | 382/132 |
| 6,658,149 | B1* | 12/2003 | Wakahara et al. | 382/215 |
| 6,766,043 | B2 | 7/2004 | Zeng et al. | 382/128 |
| 7,200,251 | B2* | 4/2007 | Joshi et al. | 382/128 |
| 7,206,462 | B1* | 4/2007 | Betke et al. | 382/280 |

OTHER PUBLICATIONS

Nodule Detection on Chest Helical CT Scans by Using a Genetic Algorithm Yongbum Lee; Hara, T.; Fujita, H.; Itoh, S.; Ishigaki, T.; Intelligent Information Systems, 1997. IIS '97. Proceedings Dec. 8-10, 1997 pp. 67-70.*
Fast Normalized Cross-Correlation J. P. Lewis Industrial Light & Magic as shown on Feb. 23, 2003 confirmed by web archive.*
"3D non-rigid registration by gradient descent on a Gaussian-windowed similarity measure using convolutions" Cachier, P.; Pennec, X.; Mathematical Methods in Biomedical Image Analysis, 2000. Proceedings. IEEE Workshop on Jun. 11-12, 2000 pp. 182-189.*

* cited by examiner

Primary Examiner—Jingge Wu
Assistant Examiner—Sean Motsinger

(57) ABSTRACT

A method of identifying spherical objects in a digital image is provided, wherein the image includes a plurality of intensities corresponding to a domain of points in a D-dimensional space. The method includes calculating a local cross-correlation between a point in the domain of the image and a Gaussian kernel about a neighborhood of the point; calculating a local standard deviation of the point in the image; calculating a local standard deviation of the Gaussian kernel; calculating a cross-correlation ratio by dividing the local cross-correlation by the product of the local standard deviation of the image and the local standard deviation of the Gaussian kernel; and analyzing the cross-correlation ratio to determine whether an object about said point is spherical. The cross-correlation ratio can take continuous values from −1 to 1, where a spherically symmetric Gaussian shaped object has a value of 1.

13 Claims, 4 Drawing Sheets

Volumetric image presenting a semi-spherical object
(a polyp attached to the colon wall in a CT image)

Detection of the semi-spherical object by normalized correlation with a Gaussian

US 7,397,938 B2

METHOD AND SYSTEM FOR FAST NORMALIZED CROSS-CORRELATION BETWEEN AN IMAGE AND A GAUSSIAN FOR DETECTING SPHERICAL STRUCTURES

CROSS REFERENCE TO RELATED UNITED STATES APPLICATIONS

This application claims priority from "Fast Normalized Cross-Correlation Between an Image and a Gaussian", U.S. Provisional Application No. 60/494,711 of Pascal Cathier, filed Aug. 13, 2003, the contents of which are incorporated herein by reference.

BACKGROUND OF THE INVENTION

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray film radiography, computed tomography ("CT") imaging, magnetic resonance imaging ("MRI"), ultrasound ("US") and nuclear medicine imaging techniques, such as positron emission tomography ("PET") and single photon emission computed tomography ("SPECT"). Digital images can also be created from analog images by, for example, scanning analog images, such as typical x-rays, into a digitized form. However, the large amount of data in digital images is generally difficult and tedious for a human, such as a physician, to interpret without additional aid. Computer-aided diagnosis ("CAD") systems play a critical role in aiding the human, especially in the visualization, segmentation, detection, registration, and reporting of medical pathologies.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system.

One of the more critical CAD tasks includes the screening and early detection of various types of cancer from a volume data (e.g., a CT volume data). For instance, lung cancer is the leading cause of deaths among all cancers in the United States and around the world. A patient diagnosed with lung cancer has an average five-year survival rate of only 14%. On the other hand, if lung cancer is diagnosed in stage I, the patient's expected five-year survival rate dramatically increases to between 60 and 70 percent. Other cancers, such as colon cancer, have also shown a decrease in mortality rates resulting from the early detection and removal of cancerous tumors. Pathologies are typically spherical or hemispherical in geometric shape. In many cases, these sphere-like pathologies are attached to linear or piece-wise linear surfaces. Unfortunately, existing methods generally do not detect characteristic symptoms of various cancers until the advanced stages of the disease. Therefore, a primary goal in advancing preventive cancer screening is to provide for earlier detection of the characteristic symptoms.

SUMMARY OF THE INVENTION

In one aspect of the invention, a method of identifying spherical objects in a digital image, wherein said image comprises a plurality of intensities corresponding to a domain of points in a D-dimensional space, is provided. The method includes calculating a local cross-correlation between a point in the domain of the image and a spatial filter about a neighborhood of the point, calculating a local standard deviation of the point in the image, calculating a local standard deviation of the spatial filter, calculating a cross-correlation ratio by dividing the local cross-correlation by the product of the local standard deviation of the image and the local standard deviation of the spatial filter, and analyzing the cross-correlation ratio to determine whether an object about said point is spherically symmetric.

In another aspect of the invention, a program storage device readable by a computer, tangibly embodying a program of instructions executable by the computer to perform a method of identifying spherical objects in a digital image, wherein said image comprises a plurality of intensities corresponding to a domain of points in a D-dimensional space, is provided. The method includes calculating a local cross-correlation between a point in the domain of the image and a spatial filter about a neighborhood of the point, calculating a local standard deviation of the point in the image, calculating a local standard deviation of the spatial filter, calculating a cross-correlation ratio by dividing the local cross-correlation by the product of the local standard deviation of the image and the local standard deviation of the spatial filter, and analyzing the cross-correlation ratio to determine whether an object about said point is spherically symmetric.

In a further aspect of the invention, a method of identifying spherical objects in a digital image, wherein said image comprises a plurality of intensities corresponding to a domain of points in a D-dimensional space, is provided. The method includes providing a Gaussian neighborhood $G_N$ of standard deviation $\sigma_N$ about a point p in the domain of the image I and providing a Gaussian kernel $G_K$ of standard deviation $\sigma_K$. The method further includes calculating a local cross-correlation of the Gaussian kernel about the point p in the neighborhood $G_N$ by according to the formula $$\langle I, G_K \rangle_p = K \cdot (G_{N,K} - G_N) * I(p)$$

wherein I(p) is the image at the point p, $G_{N,K} = G_N G_K / K$ with $$K = \frac{1}{\left(\sqrt{2\pi(\sigma_N^2 + \sigma_K^2)}\right)^D}$$

being a constant, $$\sigma_{N,K} = \frac{\sigma_N \sigma_K}{\sqrt{(\sigma_N^2 + \sigma_K^2)}},$$

and * is a convolution operator, calculating a local variance of the image I about point p according to the formula $$\sigma_p^2(I) = G_N * I^2 - (G_N * I)^2,$$

calculating a square root of the local variance of the image to find a local standard deviation of the image, calculating a local variance of the Gaussian kernel according to the formula $$\sigma^2(G_K) = \frac{1}{\left(2\pi\sigma_K \sqrt{(\sigma_K^2 + 2\sigma_N^2)}\right)^D} - \frac{1}{(2\pi(\sigma_K^2 + \sigma_N^2))^D},$$

calculating a square root of the local variance of the Gaussian kernel in order to determine its local standard deviation, and calculating a cross-correlation ratio by dividing the local cross-correlation by the product of the local standard deviation of the image and the local standard deviation of the Gaussian kernel. The cross-correlation ratio can take continuous values from −1 to 1, where a spherically symmetric Gaussian shaped object has a value of 1.

For the chest, one may be interested in detecting nodules, that appear as white spheres or half-spheres inside the dark lung region. For the colon, one may be interested in detecting polyps, which appear as round structures attached to the colon. Methods utilizing the normalized Gaussian cross-correlation can be applied to a wide range of imaging modalities, including computerized tomography (CT), magnetic resonance (MR), ultrasound (US), and positron emission tomography (PET). In another aspect, these methods can find spherical or partially spherical objects, such as half-spherical objects attached to a surface. In another aspect, these methods can also be used to detect holes, in a symmetrical way. In another aspect, a normalized cross-correlation between an image and a Gaussian kernel can be efficiently calculated.

DETAILED DESCRIPTION OF THE PREFERRED EMBODIMENT

Figure 1:
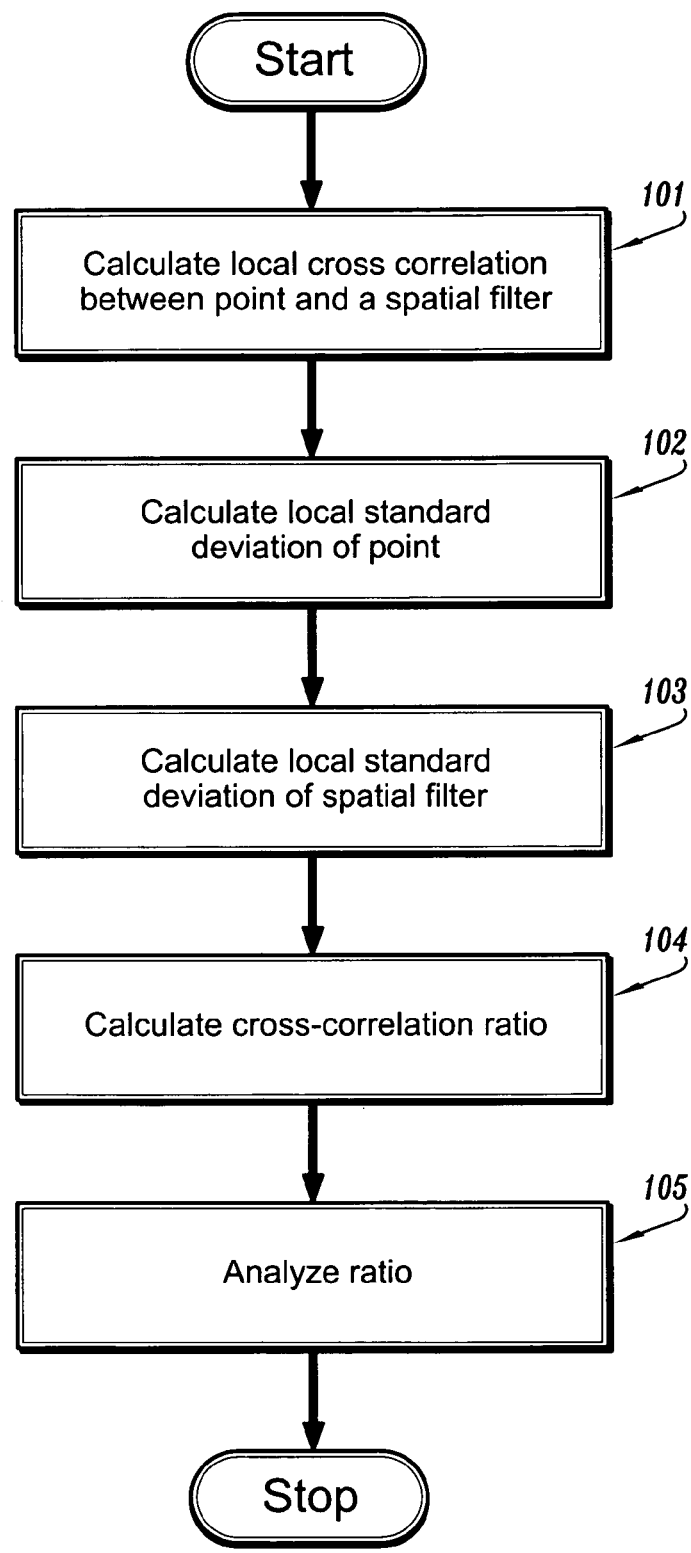
FIG. 1 depicts a flow chart of a preferred method of the invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The present invention provides for systems and methods capable of effective and accurate nodule detection from 2-D and 3-D digital images, particularly thoracic images. Although an image can be thought of as a function from $R^3$ to R, the methods of the invention are not limited to such images, and can be applied to images of any dimension, e.g. a 2-D picture or a 3-D volume. The present invention is preferably performed on a computer system, such as a Pentium®-class personal computer, running computer software that implements the algorithm of the present invention. The computer includes a processor, a memory and various input/output means. A series of digital images representative of a thoracic volume are input to the computer. The terms "digital" and "digitized" as used herein will refer to images or volumes, as appropriate, in a digital or digitized format acquired via a digital acquisition system or via conversion from an analog image.

The methods and systems disclosed herein can be adapted to organs or anatomical regions including, without limitation, the heart, brain, spinal, colon, liver and kidney systems. The software application and algorithm disclosed herein can employ 2-D and 3-D renderings and images of an organ or organ system. For illustrative purposes, a colon system is described. However, it should be understood that the method can be applied to any of a variety of other applications known to those skilled in the art.

Prior to computing a normalized cross-correlation, an image can be pre-processed, e.g. to enhance the overall outcome of the process. This is helpful in locating a structure of interest for further analysis, and for the initial centering of the weighted kernels described below. High accuracy of algorithms is crucial for successful nodule detection, and preprocessing generally reduces the complexity of the domain of the function to be estimated. Preprocessing is generally more effective when it is based on known characteristics of what is being imaged. For example, for lung fields, in addition to the above-identified characteristics, a natural lung image should be spatially smooth and strictly positive in amplitude. Examples of preprocessing techniques include various smoothing, morphological and regularization techniques.

Referring now to FIG. 1, a preferred method for computing a normalized cross-correlation is entirely based on convolution with a weighted filter. A preferred weighted filter is a D-dimensional Gaussian, which takes the form $$G(x) = \frac{1}{(\sqrt{2\pi}\,\sigma)^D} \exp\left(-\frac{x^2}{2\sigma^2}\right),$$

which is normalized to unity. Although a Gaussian is the preferred filter in the methods disclosed herein, any local spatial filter can be used and still be within the scope of the invention. Note that, in order to detect objects that are roughly spherical in shape, a preferred filter should have spherical symmetry. A normalized cross-correlation for a Gaussian neighborhood of standard deviation $\sigma_N$ about a point p can be defined as the ratio of a cross-correlation to a product of standard deviations:

$$\frac{<I, G_K>_p}{\sigma_p(I)\sigma_p(G_K)},$$

where $G_K$ denotes a Gaussian kernel. A preferred method, depicted in step 101, relies on the fact that the local correlation between an image I and the Gaussian kernel $G_K$, over a Gaussian neighborhood $G_N$ about point p in the domain of I, is also the convolution with a difference of Gaussians:

$$<I, G_K>_p = \int G_N(x-p)(I(x) - E_p(I))(G_K(x-p) - E_0(G_K))dx$$
$$= K \cdot (G_{N,K} - G_N) * I(p).$$

Here, $$K = \frac{1}{\left(\sqrt{2\pi(\sigma_N^2 + \sigma_K^2)}\right)^D}$$

is a constant, $\sigma_N$ and $\sigma_K$ are the standard deviations of Gaussians $G_N$ and $G_K$, respectively, $G_N G_K = K \cdot G_{N,K}$ with $$\sigma_{N,K} = \frac{\sigma_N \sigma_K}{\sqrt{(\sigma_N^2 + \sigma_K^2)}},$$

and * is the convolution operator. The local mean operator, $E_p$, can be defined as $$E_p(I) = \int G_N(x-p)I(x)dx = G_N * I(p).$$

Although the preferred neighborhood used in evaluating $E_p(I)$ here is the Gaussian neighborhood $G_N$, any neighbor can be used in the evaluation of $E_p(I)$.

The local variance of an image I, $$\sigma_p^2(I) = \int G_N(x-p)(I(x)-E_p(I))^2 dx,$$

can also be computed in step 102 from the following property of the variance:

$$\sigma_p^2(I) = E_p(I^2) - E_p^2(I),$$

which can hold for any spatial filter, not just a Gaussian neighborhood. In a preferred embodiment, the result can be expressed by a convolution over the Gaussian neighborhood:

$$\sigma^2(I) = G_N * I^2 - (G_N * I)^2.$$

The local standard deviation is simply the square root of the local variance.

The variance of the Gaussian kernel $G_K$ over the Gaussian neighborhood $G_N$, defined by $$\sigma^2(G_K) = \int G_N(x-p)(G_K(x) - E_p(G_K(x)))^2 dx$$
$$= E_p(G_K^2(x)) - E_p^2(G_K(x)),$$

can be calculated at step 103 by the closed-form formula:

$$\sigma^2(G_K) = \frac{1}{\left(2\pi\sigma_K\sqrt{(\sigma_K^2 + 2\sigma_N^2)}\right)^D} - \frac{1}{(2\pi(\sigma_K^2 + \sigma_N^2))^D}$$

Again, the standard deviation of the Gaussian kernel is the square root of its variance.

Taking the ratio at step 104 between the cross-correlation and the product of the standard deviations yields the normalized correlation.

Figure 2:
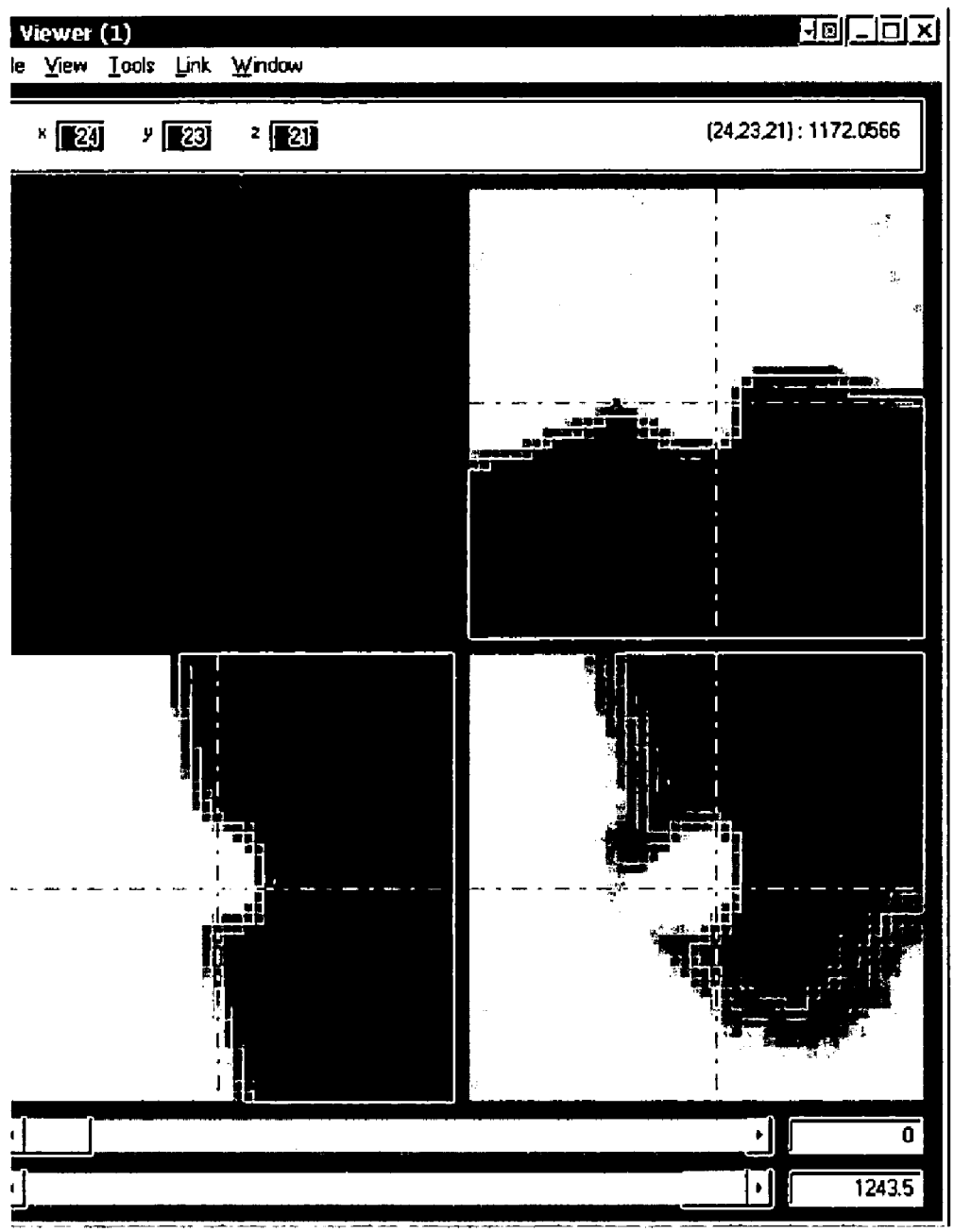
FIG. 2 depicts a volumetric image of a semi-spherical object.
Figure 3:
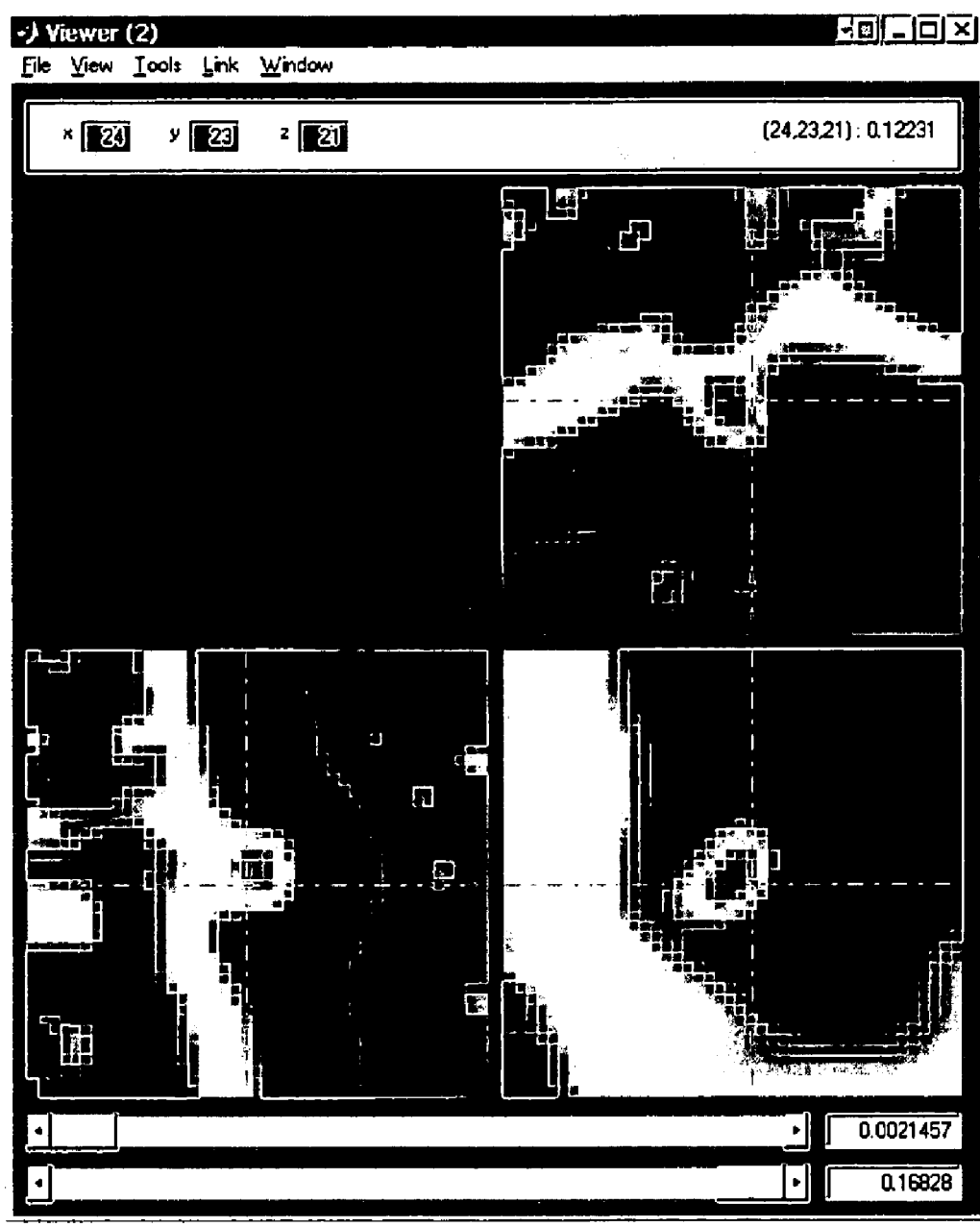
FIG. 3 depicts a semi-spherical object detected by a preferred method of the invention.

Computing this ratio can detect spherical structures in an image I. The correlation takes continuous values between −1 and 1. It has a value of 1 only if the object itself is the same shape as the filter. For a preferred Gaussian neighborhood, this object would be a spherically symmetric Gaussian. A hard sphere would not have a correlation of 1 with respect to a Gaussian neighborhood. Examples of spherical structures detectable by the methods disclosed herein are lung nodules and colon polyps, though this invention is not restricted to only these structures. The normalized cross-correlation with a Gaussian kernel can discriminate between these structures and normal structures such as lung or colon walls that are not isotropic, as depicted in FIGS. 2 and 3. Furthermore, the methods presented herein can be used to detect holes in a structure, for a hole is a region of the image represented by low intensity values, as opposed to the high intensity values that characterize polyps or nodules.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
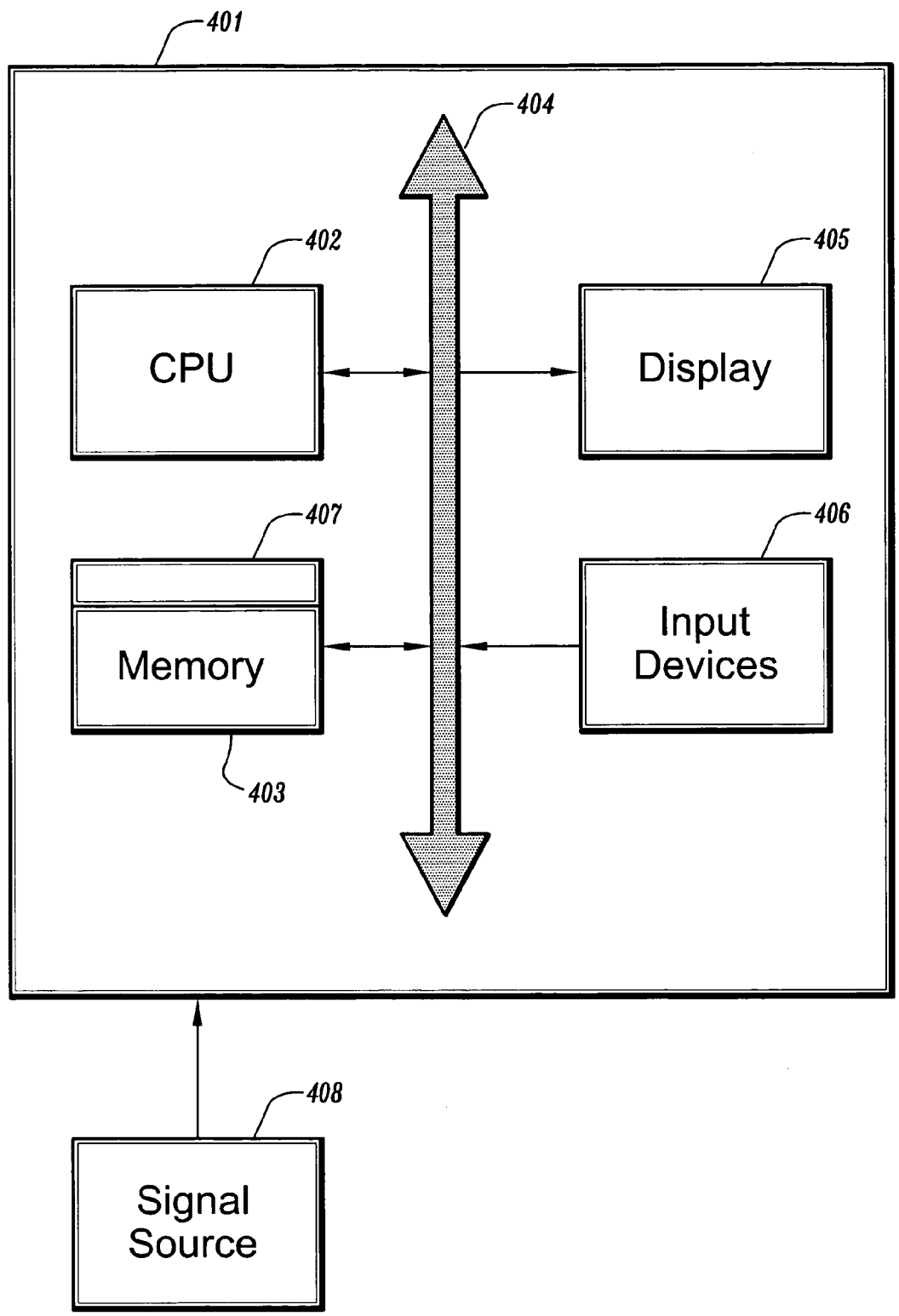
FIG. 4 depicts an exemplary computer system for implementing a preferred embodiment of the invention.

Referring now to FIG. 4, according to an embodiment of the present invention, a computer system 401 for implementing the present invention can comprise, inter alia, a central processing unit (CPU) 402, a memory 403 and an input/output (I/O) interface 404. The computer system 401 is generally coupled through the I/O interface 404 to a display 405 and various input devices 406 such as a mouse and a keyboard. The support circuits can include circuits such as cache, power supplies, clock circuits, and a communication bus. The memory 403 can include random access memory (RAM), read only memory (ROM), disk drive, tape drive, etc., or a combinations thereof. The present invention can be implemented as a routine 407 that is stored in memory 403 and executed by the CPU 402 to process the signal from the signal source 408. As such, the computer system 401 is a general purpose computer system that becomes a specific purpose computer system when executing the routine 407 of the present invention.

The computer system 401 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of identifying spherical objects in a digital image, wherein said image comprises a plurality of intensities corresponding to a domain of points in a D-dimensional space, said method comprising the steps of:
    calculating a local cross-correlation between a point in the domain of the image and a Gaussian spatial filter $G_K$ of standard deviation $\sigma_K$ about a Gaussian neighborhood $G_N$ of standard deviation $\sigma_N$ about the point, wherein the local cross-correlation is calculated by convolving over a difference of the Gaussians $G_N$ and $G_K$ according to the formula $$<I, G_K>_P = K \cdot (G_{N,K} - G_N) * I(p)$$

wherein I(p) is the image at the point p, $G_N G_K = K \cdot G_{N,K}$ with $$K = \frac{1}{\left(\sqrt{2\pi(\sigma_N^2 + \sigma_K^2)}\right)^D}$$

being constant, $$\sigma_{N,K} = \frac{\sigma_N \sigma_K}{\sqrt{(\sigma_N^2 + \sigma_K^2)}},$$

and * is a convolution operator;
    calculating a local standard deviation of the point in the image;
    calculating a local standard deviation of the spatial filter;
    calculating a cross-correlation ratio by dividing the local cross-correlation by the product of the local standard deviation of the image and the local standard deviation of the spatial filter; and
    analyzing the cross-correlation ratio to determine whether an object about said point is spherically symmetric.

2. The method of claim 1, wherein the cross-correlation ratio can take continuous values from −1 to 1, and wherein a spherically symmetric object corresponding to the spatial filter has a value of 1.

3. The method of claim 1, wherein calculating the local standard deviation of the Gaussian kernel $G_K$ further comprises calculating the local variance of $G_K$ according to the formula $$\sigma^2(G_K) = \frac{1}{\left(2\pi\sigma_K\sqrt{(\sigma_K^2 + 2\sigma_N^2)}\right)^D} - \frac{1}{(2\pi(\sigma_K^2 + \sigma_N^2))^D}$$

and
    calculating a square root of the variance.

4. The method of claim 1, wherein calculating the local standard deviation of the point further comprises:
    calculating a local variance of the image, wherein the local variance of the point p in the domain of the image is defined by the formula $$\sigma_p^2(I) = G_N * I^2 - (G_N * I)^2,$$

wherein I(x) is the image, $G_N$ is the Gaussian neighborhood and * is a convolution operator; and
    calculating a square root of the variance.

5. The method of claim 1, further comprising the step of preprocessing the image to enhance the outcome of the object identification.

6. A program storage device readable by a computer, tangibly embodying a program of instructions executable by the computer to perform a method of identifying spherical objects in a digital image, wherein said image comprises a plurality of intensities corresponding to a domain of points in a D-dimensional space, said method comprising the steps of:
    calculating a local cross-correlation between a point in the domain of the image and a Gaussian spatial filter $G_K$ of standard deviation $\sigma_K$ about a Gaussian neighborhood $G_N$ of standard deviation $\sigma_N$ about the point, wherein the local cross-correlation correlation is calculated by convolving over a difference of the Gaussians $G_N$ and $G_K$ according to the formula $$<I, G_K>_P = K \cdot (G_{N,K} - G_N) * I(p)$$

wherein I(p) is the image at the point p, $G_N G_K = K \cdot G_{N,K}$ with $$K = \frac{1}{\left(\sqrt{2\pi(\sigma_N^2 + \sigma_K^2)}\right)^D}$$

being constant, $$\sigma_{N,K} = \frac{\sigma_N \sigma_K}{\sqrt{(\sigma_N^2 + \sigma_K^2)}},$$

and * is a convolution operator;
    calculating a local standard deviation of the point in the image;
    calculating a local standard deviation of the spatial filter;
    calculating a cross-correlation ratio by dividing the local cross-correlation by the product of the local standard deviation of the image and the local standard deviation of the spatial filter; and
    analyzing the cross-correlation ratio to determine whether an object about said point is spherically symmetric.

7. The program storage device of claim 6, wherein the cross-correlation ratio can take continuous values from −1 to 1, and wherein a spherically symmetric object corresponding to the spatial filter has a value of 1.

8. The program storage device of claim 6, wherein calculating the local standard deviation of the Gaussian kernel $G_K$ further comprises the steps of calculating the local variance of $G_K$ according to the formula $$\sigma^2(G_K) = \frac{1}{\left(2\pi\sigma_K\sqrt{(\sigma_K^2 + 2\sigma_N^2)}\right)^D} - \frac{1}{(2\pi(\sigma_K^2 + \sigma_N^2))^D}$$

and calculating a square root of the variance.

9. The program storage device of claim 6, wherein calculating the local standard deviation of the point further comprises the steps of:

calculating a local variance of the image, wherein the local variance of the point p in the domain of the image is defined by the formula $$\sigma_p^2(I) = G_N * I^2 - (G_N * I)^2,$$

wherein I(x) is the image, $G_N$ is the Gaussian neighborhood and * is a convolution operator; and calculating a square root of the variance.

10. The method of claim 6, wherein the method further comprising the step of preprocessing the image to enhance the outcome of the object identification.

11. A method of identifying spherical objects in a digital image, wherein said image comprises a plurality of intensities corresponding to a domain of points in a D-dimensional space, said method comprising the steps of:

providing a Gaussian neighborhood $G_N$ of standard deviation $\sigma_N$ about a point p in the domain of the image I;

providing a Gaussian kernel $G_K$ of standard deviation $\sigma_K$;

calculating a local cross-correlation of the Gaussian kernel about the point p in the neighborhood $G_N$ calculating a local variance of the Gaussian kernel according to the formula $$\sigma^2(G_K) = \frac{1}{\left(2\pi\sigma_K\sqrt{(\sigma_K^2 + 2\sigma_N^2)}\right)^D} - \frac{1}{(2\pi(\sigma_K^2 + \sigma_N^2))^D}$$

calculating a square root of the local variance of the Gaussian kernel in order to determine its local standard deviation; and calculating a cross-correlation ratio by dividing the local cross-correlation by the product of the local standard deviation of the image and the local standard deviation of the Gaussian kernel, wherein the cross-correlation ratio can take continuous values from −1, and wherein a spherically symmetric Gaussian shaped object has a value of 1.

12. The method of claim 11, wherein said local cross-correlation is calculated according to the formula $$<I, G_K>_P = K \cdot (G_{N,K} - G_N) * I(p)$$

wherein I(p) is the image at the point p, $G_{N,K} = G_N G_K / K$ with $$K = \frac{1}{\left(\sqrt{2\pi(\sigma_N^2 + \sigma_K^2)}\right)^D}$$

being a constant, $$\sigma_{N,K} = \frac{\sigma_N \sigma_K}{\sqrt{(\sigma_N^2 + \sigma_K^2)}},$$

and * is a convolution operator.

13. The method of claim 11, further comprising calculating a local variance of the image I about point p according to the formula $$\sigma_p^2(I) = G_N * I^2 - (G_N * I)^2, \text{ and}$$

calculating a square root of the local variance of the image to find a local standard deviation of the image.

* * * * *